US 6,709,710 B2

(12) United States Patent
Krieger et al.

(10) Patent No.: US 6,709,710 B2
(45) Date of Patent: Mar. 23, 2004

(54) METHOD FOR PRODUCING COATED MINERAL SHAPED BODIES

(75) Inventors: Stephan Krieger, Hofheim (DE); Angelika Grau, Frankfurt am Main (DE)

(73) Assignee: Celanese Emulsions GmbH (DE)

( * ) Notice: Subject to any disclaimer, the term of this patent is extended or adjusted under 35 U.S.C. 154(b) by 0 days.

(21) Appl. No.: 10/257,583

(22) PCT Filed: Apr. 12, 2001

(86) PCT No.: PCT/EP01/04261

§ 371 (c)(1),
(2), (4) Date: Feb. 25, 2003

(87) PCT Pub. No.: WO01/79140

PCT Pub. Date: Oct. 25, 2001

(65) Prior Publication Data

US 2003/0161960 A1 Aug. 28, 2003

(30) Foreign Application Priority Data

Apr. 14, 2000 (DE) .......................................... 100 18 469

(51) Int. Cl.⁷ .............................. B05D 1/38; B05D 3/02
(52) U.S. Cl. .................................. 427/393.6; 427/407.1
(58) Field of Search ............................ 427/393.6, 407.1

(56) References Cited

U.S. PATENT DOCUMENTS

| 3,705,124 A | 12/1972 | Selby et al. ................ 260/29.6 |
| 4,661,170 A | 4/1987 | Osberghaus et al. ........ 148/6.27 |
| 5,705,554 A | 1/1998 | Chou et al. ................. 524/460 |
| 6,027,763 A | * 2/2000 | Brown ........................ 427/136 |
| 6,054,526 A | 4/2000 | Betremieux et al. ........ 524/802 |
| 6,136,383 A | 10/2000 | Schwartz et al. ........... 427/513 |
| 6,475,632 B1 | 11/2002 | Krieger et al. .............. 428/500 |

FOREIGN PATENT DOCUMENTS

| EP | 0 469 295 | 2/1992 |
| EP | 0 675 177 | 10/1995 |
| EP | 0 754 663 | 1/1997 |
| EP | 0 894 780 | 2/1999 |
| GB | 1152859 | * 5/1969 |
| JP | 11-228256 | * 8/1999 |
| JP | 2001-123106 | * 5/2001 |
| WO | WO 97/15604 | 5/1997 |
| WO | WO 99/48841 | 9/1999 |

OTHER PUBLICATIONS

English abstract for EP 0469295, Feb. 5, 1992.

* cited by examiner

Primary Examiner—Erma Cameron
(74) Attorney, Agent, or Firm—Muserlian, Lucas and Mercanti

(57) ABSTRACT

The invention relates to a method for producing coated mineral shaped bodies by applying an aqueous coating agent containing a polymer dispersion serving as a bonding agent and at least one aqueous styrene maleic anhydride copolymer solution. The shaped body is subsequently hardened and the coating agent is dried. The invention is characterized in that the at least one aqueous styrene maleic anhydride copolymer solution is added to the polymer dispersion after completion of the polymerization. The shaped bodies coated in such a manner exhibit an improved efflorescence behavior. The method is particularly suited for coating roofing tiles and fibrated concrete slabs.

11 Claims, No Drawings

METHOD FOR PRODUCING COATED
MINERAL SHAPED BODIES

The invention relates to a process for producing coated mineral moldings, which comprises using, for the coating process, aqueous coating compositions which comprise at least one styrene-maleic anhydride copolymer. The resultant coated moldings have improved efflorescence behavior. The process is particularly suitable for the coating of roofing tiles and of fiber-filled cement panels.

In producing concrete roofing tiles, an appropriately molded mortar mass is generally coated, prior to setting, with an emulsion paint to impart a color. The subsequent setting is then carried out together with the drying of the paint at temperatures of from 40 to 100° C. After the setting process, there may be a second coating process with an emulsion paint or with a clear lacquer. The task of the emulsion paint, besides coloring, is to prevent lime efflorescence during the setting of the concrete roofing tiles.

In order that the paint does not coagulate on the unset concrete, which is termed green concrete, a certain degree of cement-compatibility and salt resistance is required from the binder present in the paint. This is generally achieved by using ionic and/or nonionic emulsifiers, and also by using functional monomers, e.g. methacrylic acid, acrylic acid, maleic acid, acrylamide, methacrylamide, ethenesulfonate, sulfoxyalkyl methacrylate, or acrylamidoalkylsulfonic acids.

Another task for the emulsion paint is to prevent or reduce soiling, and in particular algal growth, on the finished roofing tiles.

EP-A-0 894 780 describes radiation-cured coatings for mineral moldings with improved resistance to efflorescence, but their production requires relatively high levels of technical resource and is relatively costly.

EP-A-0 754 663 describes the coating of cement-like substrates, the efflorescence behavior being improved by foaming the coatings onto the substrates, using aliphatic ($C_{12}$–$C_{24}$) carboxylic acids as foaming agents.

EP-A-0 469 295 describes coatings whose efflorescence behavior is improved by the use of emulsifiers based on sulfonated diaryl ethers.

WO 99/48841 describes the use of carboxymethylcellulose as protective colloid to prepare dispersions with good resistance to efflorescence and adequate stability.

WO 97/15604 describes styrene-acrylate latices which are prepared by emulsion polymerization of styrene and acrylates in the presence of a styrene-maleic anhydride copolymer, and are suitable for preparing solvent-free paints.

Surprisingly, it has now been found that when mineral moldings are coated with an aqueous coating composition comprising a polymer dispersion as binder, the efflorescence behavior of the coated moldings is improved if the polymer dispersion comprises at least one styrene-maleic anhydride copolymer solution which is added to the polymer dispersion after conclusion of the polymerization.

The present application therefore provides a process for preparing an at least partially coated mineral molding, by applying an aqueous coating composition comprising a polymer dispersion as binder and comprising at least one aqueous styrene-maleic anhydride copolymer solution to at least part of the surface of the molding, followed by setting of the molding and drying of the coating composition, which comprises adding the at least one aqueous styrene-maleic anhydride copolymer solution to the polymer dispersion after conclusion of the polymerization.

For the purposes of the present invention, examples of these moldings are stones, tiles, concrete blocks, roofing tiles, panels, pipes, and sculptures.

The coating composition may be applied by any of the techniques familiar to the skilled worker.

The setting of the molding and drying of the coating composition preferably takes place at temperatures of from 40 to 100° C.

Based on solids content, the polymer dispersions preferably comprise from 0.5 to 5% by weight, particularly preferably from 1 to 3% by weight, of styrene-maleic anhydride copolymers.

The styrene-maleic anhydride copolymer solutions here are preferably prepared by stirring the styrene-maleic anhydride copolymers into water, and dissolving these by adding a solution of an alkali, e.g. ammonia, monoethanolamine, sodium hydroxide, and/or potassium hydroxide, at temperatures of from 20 to 100° C. The pH of the finished solution is preferably >8.

Suitable styrene-maleic anhydride copolymer solutions also include commercially available solutions, e.g. SMA 1000 HNa®, SMA 2000 HNa®, SMA 3000 HNa® and SMA 4000 HNa® (Elf Atochem).

The polymer dispersions are preferably based on polymers which contain a) from 85 to 100% by weight, particularly preferably from 85 to 99.8% by weight, of esters of acrylic acid with $C_1$–$C_{12}$ alkanols, e.g. ethyl acrylate, butyl acrylate, n-octyl acrylate, and 2-ethylhexyl acrylate, esters of methacrylic acid with $C_1$–$C_{12}$ alkanols, e.g. methyl methacrylate, butyl methacrylate, cyclohexyl methacrylate, and isobornyl methacrylate, and/or vinylaromatic monomers, such as styrene and vinyltoluene, b) from 0 to 5% by weight, particularly preferably from 0.2 to 5% by weight, of stabilizing monomers, and c) from 0 to 10% by weight of other monomers.

Preference is given here to those combinations of softening monomers, e.g. butyl acrylate and 2-ethylhexyl acrylate, and of hardening monomers, e.g. methyl methacrylate and styrene, which give the polymers a glass transition temperature which is preferably in the range from −10 to 60° C., particularly preferably in the range from −5 to 45° C., and in particular in the range from 0 to 30° C.

Preferred monomers a) are esters of acrylic acid with $C_1$–$C_{12}$ alkanols and/or styrene.

Preferred stabilizing monomers b) are carboxylic acids, e.g. acrylic acid, methacrylic acid, and itaconic acid, carboxamides, e.g. acrylamide, methacrylamide, phosphates, e.g. (meth)acryloyloxyalkyl phosphates, phosphonates, sulfates, sulfonates, e.g. sodium ethenesulfonate, sulfoalkyl (meth)acrylates, e.g. the potassium salt of sulfopropyl methacrylate (SPM®, from the company Raschig), and/or sulfoalkyl(meth)acrylamides, e.g. the sodium salt of acrylamido-2-methylpropanesulfonic acid (AMPS®, from the company Lubrizol).

Preferred monomers c) are keto-group-containing monomers, e.g. acetoacetoxy-group-containing monomers, copolymerizable derivatives of diacetone, e.g. diacetoneacrylamide and diacetonemethacrylamide, copolymerizable silanes, e.g. alkoxyvinylsilanes, and (meth)acryloyloxyalkylsilanes, copolymerizable ethyleneurea derivatives, e.g. N-((meth)acryloxyethyl)-N,N'-ethyleneurea and N-(acrylamidoethyl)-N, N'-ethyleneurea, hydroxyl-group-functionality monomers, e.g. hydroxyalkyl (meth)acrylates, and/or epoxy-functionality monomers, e.g. glycidyl methacrylate.

Particularly preferred monomers c) are the acetoacetoxy-group-containing monomers acetoacetoxyethyl methacrylate, acetoacetoxybutyl methacrylate, acrylamidomethylacetylacetone, vinyl acetoacetate, diacetoneacrylamide, and diacetonemethacrylamide.

To improve soiling behaviour, polymer dispersions which, as other monomers c), contain keto-group-containing monomers advantageously also contain polyfunctional carboxylic hydrazides which have at least two hydrazide groups. It is preferable for the ratio of hydrazide groups to keto groups used to be equimolar. Particularly suitable polyfunctional carboxylic hydrazides are adipic dihydrazide, oxalic dihydrazide, isophthalic dihydrazide, and/or polyacrylic polyhydrazide.

Other suitable polymer dispersions are commercially available straight acrylate dispersions and styrene-acrylate dispersions, e.g. Mowilith®DM 611, Mowilith® DM 777, Mowilith® LDM 7412 and Mowilith® 771 (Clariant GmbH).

The polymer dispersions may be prepared by the customery processes of emulsion polymerization, where the monomers are emulsified in the aqueous phase in the presence of emulsifiers, initiators, and protective colloids, and are advantageously polymerized at temperatures of from 60 to 95° C.

The emulsion polymerization may be carried out by the familiar processes known to the skilled worker, e.g. batch processes, metered-monomer processes, or emulsion-feed processes. It is preferable to use the emulsion-feed process, in which a small amount of the monomers is prepolymerized and then the remainder of the monomers is metered in in the form of an aqueous emulsion. Where appropriate, it is also possible for a number of different monomer emulsions to be metered in one after the other.

Based on the content of polymer, the dispersions preferably comprise up to 3% by weight, particularly preferably up to 2% by weight, of ionic emulsifiers, and preferably up to 6% by weight, particularly preferably up to 4%, of nonionic emulsifiers.

Examples of suitable nonionic emulsifiers are alkyl polyglycol ethers, e.g. ethoxylation products of lauryl, oleyl, or stearyl alcohol, or mixtures of the same, e.g. coconut fatty alcohol; alkylphenol polyglycol ethers, e.g. ethoxylation products of octyl- or nonylphenol, diisopropylphenol, triisopropylphenol, and di- or tri-tert-butylphenol; and ethoxylation products of polypropylene oxide.

Preferred suitable ionogenic emulsifiers are anionic emulsifiers, e.g. the alkali metal or ammonium salts of alkyl-, aryl- or alkylarylsulfonates or -phosphonates, or of alkyl, aryl, or alkylaryl sulfates, or of alkyl, aryl, or alkylaryl phosphates, or compounds with other anionic end groups, and it is also possible here for there to be oligo- or polyethylene oxide units between the hydrocarbon radical and the anionic group. Typical examples are sodium lauryl sulfate, sodium undecyl glycol ether sulfate, sodium lauryl diglycol sulfate, sodium tetradecyl triglycol sulfate, sodium octylphenol glycol ether sulfate, sodium dodecylbenzenesulfonate, sodium lauryl diglycol sulfate, and ammonium tri-tert-butylphenol penta- and octaglycol sulfate.

For initiation and further conduct of the polymerization, use may be made of oil- or water-soluble free-radical generators or redox systems. Examples of those suitable are hydrogen peroxide, potassium peroxodisulfate, sodium peroxodisulfate, ammonium peroxodisulfate, dibenzoyl peroxide, lauryl peroxide, tri-tert-butyl peroxide, bisazodiisobutyronitrile, alone or together with reducing components, e.g. sodium bisulfite, Rongalit, glucose, ascorbic acid, or other reducing compounds. It is preferable to use peroxodisulfates.

In the polymerization use may also be made of regulators, e.g. mercaptans, in particular N-dodecyl mercaptan, thiophenol, and 2-methyl-5-tert-butylthiophenol, in amounts of up to 1% by weight, preferably up to 0.5% by weight. However, it is advantageous to avoid the use of regulators.

If the emulsion polymerization process used has two or more stages, it is advantageous for the combination of the hardening and the softening monomers and the ratio of the phases to be such that the dispersion has a minimum film-forming temperature in the range from 0 to 50° C. and that the resultant films of dispersion have an elongation at break of >150% at a film thickness of 100 μm.

The pH of the dispersions is preferably set to 6.5–10, particularly preferably 7.0–9.0. Examples of bases suitable for this purpose are aqueous solutions of the hydroxides of ammonia, of alkali metals, or of alkaline earth metals. It is also possible to use buffers, e.g. sodium hydrogenphosphate, sodium acetate, or sodium hydrogencarbonate, and, where appropriate, these may be used during the emulsion polymerization itself.

Where appropriate, the coating compositions also comprise film-forming auxiliaries, e.g. white spirit, Texanol®, butyl glycol, butyl diglycol, butyl dipropylene glycol, and butyl tripropylene glycol, plasticizers, e.g. dimethyl phthalate, dibutyl phthalate, diisobutyl adipate, dispersing agents, e.g. polyacrylic acids and appropriate copolymers, e.g. Lopon® 890, Dispex® G40, thickeners, e.g. those based on polyacrylates and on polyurethanes, e.g. Borchigel® L75 and Tafigel® PUR 60, emulsifiers, stabilizers, protective colloids, preservatives, antifoams, e.g. mineral oil antifoams and silicone antifoams, wetting agents, e.g. aminomethylpropanol, fillers, e.g. calcite, chalk, powdered quartz, and baryte, pigments, e.g. iron oxide red, black pigments, and organic pigments, and/or other additives usual for formulating coating compositions.

The desired viscosity of the coating compositions may be set by adding water and/or using thickeners.

One embodiment carries out the process in such a way that, following the setting of the molding and drying of the coating composition, another layer of the same coating composition or of another coating composition is applied to the molding, and then the coating composition is dried and, where appropriate, the process is then repeated one or more times.

The process of the invention is particularly suitable for the coating of roofing tiles or of fiber-filled cement panels.

The coating compositions are preferably roofing tile paints.

The invention also provides moldings which are produced by the process described above.

The examples below serve to illustrate the invention, but do not restrict the same.

EXAMPLES 1 to 8

Preparation of Polymer Dispersions Comprising Styrene-maleic Anhydride Copolymer Solutions

EXAMPLE 1

20 g of a 25% strength styrene-maleic anhydride copolymer solution, SMA 3000 HNa® (Elf Atochem), are stirred into 1000 g of Mowilith® DM 611 styrene-acrylate dispersion (Clariant GmbH, solids content about 50%).

EXAMPLE 2

20 g of the 25% strength styrene-maleic anhydride copolymer solution SMA 3000 HNa® (Elf Atochem) are stirred into 1000 g of Mowilith® DM 777 styrene-acrylate dispersion (Clariant GmbH, solids content 46%).

EXAMPLE 3

20 g of the 25% strength styrene-maleic anhydride copolymer solution SMA 3000 HNae (Elf Atochem) are stirred into 1000 g of Mowilith® LDM 7412 styrene-acrylate dispersion (Clariant GmbH, solids content about 46%).

EXAMPLE 4

20 g of the 25% strength styrene-maleic anhydride copolymer solution SMA 3000 HNa® (Elf Atochem) are stirred into 1000 g of Mowilith® LDM 771 styrene-acrylate dispersion (Clariant GmbH, solids content 50%).

EXAMPLE 5

A dispersion is prepared as follows:

| Using a high-speed stirrer, a monomer emulsion composed of: | |
|---|---|
| 965.6 parts by weight of | water |
| 185.7 parts by weight of | a 28% strength solution of a $C_{12}$–$C_{14}$-alkyl polyglycol ether sulfate having about 3 ethylene oxide units |
| 26.0 parts by weight of | methacrylic acid |
| 15.6 parts by weight of | acrylic acid |
| 3.0 parts by weight of | ammonium peroxodisulfate |
| is stirred into a mixture composed of: | |
| 2808 parts by weight of | methyl methacrylate and |
| 2392 parts by weight of | butyl acrylate, | and stirring is continued until a stable emulsion is produced. 2470 parts by weight of water, 9.3 parts by weight of a 28% strength solution of a $C_{12}$–$C_{14}$-alkyl polyglycol ether sulfate having about 3 ethylene oxide units, and 312 parts by weight of the monomer emulsion are then heated to 80° C. in a suitable reaction vessel, and treated with a solution of 2.6 parts by weight of ammonium peroxodisulfate in 69.4 parts by weight of water. The remaining monomer emulsion is then metered within a period of 3.5 hours. Heating is continued for a further 60 minutes, followed by cooling. The pH of the dispersion is set to 9.0, using 12.5% strength ammonia solution. The solids content of the dispersion is about 52.7%, and the minimum film-forming temperature MFT is about 14° C.

EXAMPLE 6

20 g of a 25% strength styrene-maleic anhydride copolymer solution, SMA 3000 HNa® (Elf Atochem), are stirred into 1000 g of the dispersion from Example 5.

EXAMPLE 7

A dispersion is prepared as follows:

| Using a high-speed stirrer, a monomer emulsion composed of: | |
|---|---|
| 589.3 parts by weight of | water |
| 53.6 parts by weight of | a 28% strength solution of a $C_{12}$–$C_{14}$-alkyl polyglycol ether sulfate having about 3 ethylene oxide units |
| 45.0 parts by weight of | AMPS R ® 2430 solution (Lubrizol) |
| 3.0 parts by weight of | sodium hydrogencarbonate |
| 4.5 parts by weight of | sodium peroxodisulfate |
| is stirred into a mixture composed of: | |
| 810 parts by weight of | methyl methacrylate and |
| 690 parts by weight of | butyl acrylate, | and stirring is continued until a stable emulsion is produced. 712.5 parts by weight of water, 2.7 parts by weight of a 28% strength solution of a $C_{12}$–$C_{14}$-alkyl polyglycol ether sulfate having about 3 ethylene oxide units, and 90 parts by weight of the monomer emulsion are then heated to 80° C. in a suitable reaction vessel, and treated with a solution of 0.75 parts by weight of sodium peroxodisulfate in 7.5 parts by weight of water. The remaining monomer emulsion is then metered within a period of 3.5 hours. Heating is continued for a further 60 minutes, followed by cooling. The solids content of the dispersion is about 52%, and the minimum film-forming temperature MFT is 16° C.

EXAMPLE 8

20 g of a 25% strength styrene-maleic anhydride copolymer solution, SMA 3000 HNa® (Elf Atochem), are stirred into 1000 g of the dispersion from Example 7.

EXAMPLES 9 and 10

Preparation of Color Pastes

EXAMPLE 9

| A color paste for roofing tile paints is prepared by introducing | |
|---|---|
| 18.0 g | of Lopon ® 890 (BK Giulini) dispersing agent |
| 6.0 g | of AMP 90 ® (Angus Chemie GmbH) wetting agent |
| 3.0 g | of Mergal ® K 14 (Troy) preservative |
| in 328 g of water, and a dissolver is used to disperse the following, in succession, into the mixture | |
| 75.0 g | of China Clay B ®(ECC International) |
| 630.0 g | of Omyacarb ® 5 GU (Omya) |
| 180.0 g | of iron oxide black |
| 4.5 g | of Tylose ® H 300 (Clariant GmbH). |

EXAMPLE 10

A color paste is prepared by using a dissolver to stir 200 g of calcite filter and then 50 g of iron oxide red pigment into 100 g of water.

EXAMPLES 11 to 16

Preparation of paints: coating of Eterplan panels, and assessment of efflorescence behavior (comparative examples 12, 14 and 16)

Paints are prepared by using a laboratory stirrer to stir together the components given in Table 1 in succession in the sequence given. The paints are then doctored at 300 μm wet thickness onto Eterplan panels and dried for 24 hours at room temperature. Before this, the Eterplan panels were painted with a 33% strength CaCl₂ solution and dried for 24 hours at room temperature, in order to promote efflorescence. The painted panels are then stored for 7 days, with the coated side above a water bath heated at 60° C., in order to promote efflorescence. The panels are then dried at room temperature and the efflorescence assessed. The results are given in Table 1.

Table 1 shows that adding a styrene-maleic anhydride copolymer solution improves the efflorescence behavior of the paints.

EXAMPLES 17 to 22

Preparation of paints, coating of Eterplan panels, and assessment of efflorescence behavior (comparative examples 18, 20 and 22)

Paints are prepared by using a laboratory stirrer to stir together the components given in Table 2 in succession in the sequence given. The paints are then doctored at 300 μm wet thickness onto Eterplan panels and dried for 24 hours at room temperature. Before this, the Eterplan panels were painted with a 33% strength CaCl₂ solution and dried for 24 hours at room temperature, in order to promote efflorescence. The painted panels are then stored for 7 days, with the coated side above a water bath heated at 60° C., in order to promote efflorescence. The panels are then dried at room temperature and the efflorescence assessed.

Table 2 shows that adding a styrene-maleic anhydride copolymer solution improves the efflorescence behavior of the paints.

TABLE 1

|  | Example 11 | Example 12 (Comparison) | Example 13 | Example 14 (Comparison) | Example 15 | Example 16 (Comparison) |
|---|---|---|---|---|---|---|
| Dispersion | 193 g of dispersion from example 1 | 193 g of Mowilith ® DM 611 (styrene-acrylate dispersion, Clariant GmbH) | 187 g of dispersion from example 2 | 187 g of Mowilith ® DM 777 (straight acrylate dispersion, Clariant GmbH) | 194 g of dispersion from example 3 | 194 g of Mowilith ® LDM 7412 (straight acrylate dispersion, Clariant GmbH) |
| Paste | 140 g of paste from example 9 | 140 g of paste from example 9 | 140 g of paste from example 9 | 140 g of paste from example 9 | 140 g of paste from example 9 | 140 g of paste from example 9 |
| Butyl diglycol |  |  | 7 g | 7 g | 2 g | 2 g |
| Water |  |  | 3 g | 3 g | 1 g | 1 g |
| White spirit | 2 g |  |  |  |  |  |
| Dimethyl phthalate | 2 g |  |  |  |  |  |
| Polyurethane thickener |  |  | 0.33 g | 0.33 g | 0.26 g | 0.26 g |
| Silicone antifoam | 1.2 g | 1.2 g | 1.2 g | 1.2 g | 1.2 g | 1.2 g |
| Efflorescence | none | slight | none | marked | slight | marked |

TABLE 2

|  | Example 17 | Example 18 (Comparison) | Example 19 | Example 20 (Comparison) | Example 21 | Example 22 (Comparison) |
|---|---|---|---|---|---|---|
| Dispersion | 187 g of dispersion from example 4 | 187 g of Mowilith ® DM 771 (straight acrylate dispersion, Clariant GmbH) | 187 g of dispersion from example 6 | 187 g of dispersion from example 5 | 500 g of dispersion from example 8 | 500 g of dispersion from example 7 |
| Paste | 140 g of paste from example 9 | 140 g of paste from example 9 | 140 g of paste from example 9 | 140 g of paste from example 9 | 350 g of paste from example 10 | 350 g of paste from example 10 |
| Butyl diglycol | 7 g | 7 g | 7 g | 7 g | 18 g | 18 g |
| Water | 3 g | 3 g | 3 g | 3 g | 9 g | 9 g |
| White spirit |  |  |  |  |  |  |
| Dimethyl phthalate |  |  |  |  |  |  |
| Polyurethane thickener |  |  | 0.33 g | 0.33 g | 0.23 g | 0.23 g |
| Silicone antifoam | 1.2 g | 1.2 g | 1.2 g | 1.2 g | 3.1 g | 3.1 g |
| Efflorescence | none | slight | none | slight | none | slight |

What is claimed is:

1. A process for producing an at least partially coated mineral molding, said process comprising: applying an aqueous coating composition comprising a polymer dispersion as binder and comprising at least one aqueous styrene-maleic anhydride copolymer solution to at least part of a surface] of a mineral molding, setting the mineral molding and drying the aqueous coating composition, wherein the at least one aqueous styrene-maleic anhydride copolymer solution is added to the polymer dispersion after conclusion of the polymerization of the polymer dispersion.

2. The process as claimed in claim 1, wherein, based on solids content, the aqueous coating composition comprises from 0.5 to 5% by weight of styrene-maleic anhydride copolymer.

3. The process as claimed in claim 1, wherein the polymer dispersion is based on a polymer comprising monomers:

a) from 85 to 100% by weight of a monomer selected from the group consisting of esters of acrylic acid with $C_1$–$C_{12}$ alkanols, esters of methacrylic acid with $C_1$–$C_{12}$ alkanols, vinylaromatic monomers, and mixtures thereof, b) from 0 to 5% by weight of stabilizing monomers, and c) from 0 to 10% by weight of other monomers, where the glass transition temperature $T_g$ of the polymer is from −10 to 60° C.

4. The process as claimed in claim 3, wherein the monomers a) are esters of acrylic acid with $C_1$–$C_{12}$ alkanols and/or styrene.

5. A process as claimed in claim 3, wherein the monomers b) are monomers selected from the group consisting of carboxylic acids, carboxamides, phosphates, phosphonates, sulfates, land/on sulfonates, and mixtures thereof.

6. The process as claimed in claim 3, wherein the monomers c) are monomers selected from the group consisting of keto-group-containing monomers, copolymenizable derivatives of diacetone, copolymenizable silanes, copolymerizable ethyleneurea derivatives, and mixtures thereof.

7. The process as claimed in claim 1, wherein the coating composition further comprises components selected from the group consisting of film-forming agents, dispersing agents, thickeners, emulsifiers, protective colloids, stabilizers, preservatives, antifoams, wetting agents, pigments, fillers, and mixtures thereof.

8. The process as claimed in claim 1, further comprising following the setting of the mineral molding and drying of the aqueous coating composition, applying another layer of the aqueous coating composition to the mineral molding, and drying the aqueous coating composition and, where appropriate, repeating the applying and drying steps one or more times.

9. The process as claimed in claim 1, wherein the mineral molding is a roofing tile or fiber-filled cement panel.

10. The process as claimed in claim 1, wherein the aqueous coating composition is a roofing-tile paint.

11. A mineral molding obtained by the process as claimed in claim 1.

* * * * *